Nov. 26, 1946.    R. B. SPEED    2,411,560

SELENIUM ELEMENT

Filed June 25, 1943

INVENTOR.
RICHARD B. SPEED
BY
ATTORNEY

Patented Nov. 26, 1946

2,411,560

UNITED STATES PATENT OFFICE 2,411,560

SELENIUM ELEMENT

Richard B. Speed, Newark, N. J., assignor to Federal Telephone & Radio Corporation, New York, N. Y., a corporation of Delaware Application June 25, 1943, Serial No. 492,292

3 Claims. (Cl. 175—366)

This invention relates to selenium elements of the type comprising a layer of selenium sandwiched between a base or back electrode and a front or counter electrode, and has for its object to provide a satisfactory counter electrode material which will enable the element to perform efficiently.

Selenium elements such as rectifiers commonly comprise an adherent layer of selenium on the base or carrier plate and a coating of a conducting counter electrode over the selenium surface. The counter electrode is ordinarily applied by spraying over the selenium of metal alloy which closely adheres to the selenium. According to theory a so-called "blocking layer" forms on the selenium surface just beneath the counter electrode and this gives the element its rectifying characteristics of readily passing current in the forward direction while resisting the flow of current in the reverse direction; and the effectiveness of the rectifier is thought to depend in large part on the quality of the blocking layer which is formed. The quality of the blocking layer is largely dependent on the material in the counter electrode itself. Counter electrode materials heretofore in general use ordinarily comprise an alloy containing cadmium and other metals, for example, an alloy of cadmium, bismuth and tin. Other metals than bismuth and tin have successfully been used in the alloy but difficulty is experienced when it is attempted to eliminate the cadmium.

It is sometimes desirable to use alloy which does not contain cadmium, and according to this invention there is provided a counter electrode alloy for the purpose which does not contain cadmium. We have found it possible to use an alloy without cadmium by including lead in the alloy. Specifically we have found that alloys of lead, bismuth and tin are suitable and can be made to operate substantially as efficiently as alloys containing cadmium.

Figure 1:
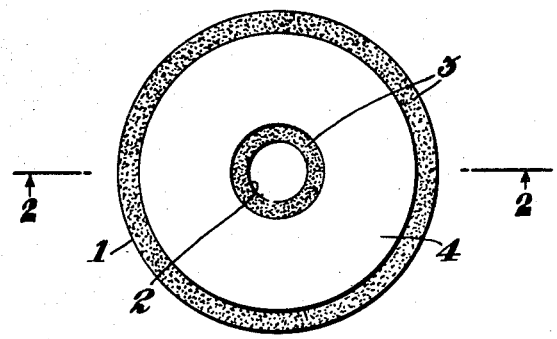
Figure 2:
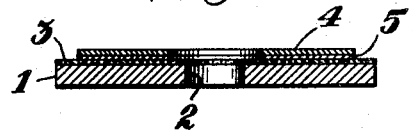

The invention will be better understood from the following detailed description taken in conjunction with the accompanying drawing of which Fig. 1 shows a face view of a selenium rectifying element containing a counter electrode alloy, and Fig. 2 is a side sectional view taken at line 2—2 of Fig. 1.

The base or carrier plate 1 is ordinarily a plate or disc of metal which may be aluminum or iron or steel or may be nickel plated if desired. In accordance with a common practice it is shown with a central hole 2, although it will be understood that the central hole need not always be used. The surface of the plate is commonly roughened and then covered in a well-known manner by a layer 3 of selenium which may, for example, be around .003 to .006 inch thick. The selenium should be in the crystalline form and such a crystalline layer may be applied, for example, by melting selenium powder and spreading it over the surface of the base plate, and then allowing it to cool which leaves an adherent layer of vitreous selenium. This is then commonly subjected to a heat and pressure treatment to crystallize the selenium to the desired metallic form. Methods of crystallizing a vitreous layer of selenium for this purpose are well known in the art and need not be described in detail here. The selenium may then be subjected to one or more of a number of well-known surface treatments which need not be described here as they are no part of this invention. The counter electrode 4 is then applied, ordinarily by spraying the surface with a molten metallic alloy after first masking the outer peripheral margin, and also the inner peripheral margin around the central hole if there be a central hole, in order to prevent short circuiting from the counter electrode to the base plate.

According to theory when the counter-electrode is applied there is formed at the junction between the counter electrode layer 4 and the surface of the selenium 3 a barrier layer 5 of minute thickness, possibly molecular thickness, which serves to produce the rectifying property. The quality and effectiveness of the barrier layer 5 is dependent upon the materials of which the counter electrode 4 is composed. In accordance with my invention I find that an eminently satisfactory barrier layer, providing efficient rectifying characteristics, can be obtained by using as the counter electrode an alloy of lead, bismuth and tin. I have found that about half of this alloy, by weight, should be of bismuth and the remaining half may be composed of the lead and tin, the proportions of these latter two elements being permitted to vary quite widely.

Suitable counter electrodes are produced from alloys containing about 50% to 54% bismuth, about 12.5% to 40% lead and about 8% to 37.5% tin by weight.

For example, proportions which I have found exceptionally well suited are 52% bismuth, 40% lead and 8% tin, by weight. Permissible variations may be illustrated by the following three examples of alloys which have also been found to give satisfactory results:

(a) 54% bismuth, 15% lead and 31% tin;
(b) 50% bismuth, 12.5% lead and 37.5% tin;
(c) 53.5% bismuth, 20% lead and 26.5% tin.

The alloys made according to this invention may be readily applied to the surface of the selenium in well-known manner by means of an alloy spray which sprays the alloy in molten form in fine particles on the selenium surface. The alloy solidifies forming a completely conductive coating in intimate contact with the selenium surface. The rectifying characteristics of a rectifier having such an alloy are found to be exceptionally satisfactory, there being a high ratio of forward conductivity to reverse conductivity, and the blocking layer is sufficiently strong to withstand a substantial voltage.

What is claimed is:

1. A selenium element having a counter electrode coating of an alloy of bismuth, lead and tin, the bismuth being approximately one half of the composition by weight and the remaining half being composed of the lead and tin.

2. A selenium element having a selenium layer on a base plate and a counter-electrode layer over the selenium, said counter-electrode layer comprising an alloy of about 50 to 54% bismuth, 12.5 to 40% lead and 8 to 37.5% tin, by weight.

3. A selenium element having a selenium layer adhering to a base plate and a counter-electrode coating over the selenium, said counter-electrode coating comprising an alloy of about 52% bismuth, 40% lead and 8% tin, by weight.

RICHARD B. SPEED.